(12) United States Patent
Gulati

(10) Patent No.: US 8,780,278 B2
(45) Date of Patent: Jul. 15, 2014

(54) MOTION-SENSING REMOTE CONTROL

(75) Inventor: Kunal Gulati, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 977 days.

(21) Appl. No.: 11/948,479

(22) Filed: Nov. 30, 2007

(65) Prior Publication Data
US 2009/0141184 A1 Jun. 4, 2009

(51) Int. Cl.
*H04N 5/44* (2011.01)

(52) U.S. Cl.
USPC .......................................... 348/734; 348/552

(58) Field of Classification Search
USPC ............. 348/734, 553–555, 552; 340/825.69, 340/825.72, 432; 341/20, 176, 173
See application file for complete search history.

(56) References Cited

U.S. PATENT DOCUMENTS

| | | | |
|---|---|---|---|
| 5,594,469 A | 1/1997 | Freeman et al. | |
| 6,346,891 B1 | 2/2002 | Feinleib et al. | |
| 6,498,628 B2 | 12/2002 | Iwamura | |
| 6,603,420 B1 * | 8/2003 | Lu | 341/176 |
| 6,750,801 B2 * | 6/2004 | Stefanik | 341/176 |
| 7,023,499 B2 | 4/2006 | Williams et al. | |
| 7,173,604 B2 | 2/2007 | Marvit et al. | |
| 7,535,401 B2 * | 5/2009 | Tolmei | 341/176 |
| 7,653,926 B2 * | 1/2010 | Stefanik | 725/58 |
| 2004/0239702 A1 | 12/2004 | Kang et al. | |
| 2005/0271279 A1 | 12/2005 | Fujimura et al. | |
| 2006/0061545 A1 | 3/2006 | Hughes et al. | |
| 2006/0166620 A1 | 7/2006 | Sorensen | |
| 2007/0113207 A1 | 5/2007 | Gritton | |
| 2007/0291112 A1 | 12/2007 | Harris | |
| 2008/0151125 A1 | 6/2008 | Bucchieri | |
| 2008/0303959 A1 * | 12/2008 | Mears et al. | 348/731 |

FOREIGN PATENT DOCUMENTS

| | | |
|---|---|---|
| CN | 1885363 | 12/2006 |
| JP | 2003111171 | 4/2003 |
| JP | 2005184584 | 7/2005 |
| JP | 2006211497 | 8/2006 |
| JP | 2006324899 | 11/2006 |
| KR | 20030046094 | 6/2003 |

(Continued)

OTHER PUBLICATIONS

"PCT Search Report and Written Opinion", Application No. PCT/US2008/081899, (Mar. 27, 2009), 12 pages.

(Continued)

*Primary Examiner* — Trang U Tran
(74) *Attorney, Agent, or Firm* — Micah Goldsmith; Glen Johnson; Micky Minhas

(57) ABSTRACT

A motion-sensing remote control is described. In an embodiment, a television remote control can include various sensors that sense a motion of the device. The television remote control also includes an integrated circuit that receives a motion signal corresponding to the motion from the sensors and converts the motion signal into a remote control command. The television remote control further includes a light source that is activated by the integrated circuit to communicate the remote control command to a television client device to initiate a device action. In another embodiment, a television remote control can include various sensors that sense a motion of the device. The television remote control can also include computer-executable instructions that execute on a processor to translate the motion into a remote control command, and initiate communication of the remote control command to a television client device to initiate a device action.

20 Claims, 3 Drawing Sheets

(56) References Cited

FOREIGN PATENT DOCUMENTS

| KR | 20070028794 | 3/2007 |
|---|---|---|
| WO | WO-0140807 | 6/2001 |
| WO | WO2005071636 A1 | 8/2005 |
| WO | WO-2005109215 | 11/2005 |
| WO | WO-2006098306 | 9/2006 |
| WO | WO-2007060287 | 5/2007 |

OTHER PUBLICATIONS

Moore, "Telekom Austria Unveils Motion-Activated Remote Control", DMeurope.com & DME Ltd., 2004-2007, pp. 1-3.

Boehme, et al., "Neural Networks for Gesture-based Remote Control of a Mobile Robot", In International Joint Conference on Neural Networks, vol. 1371, IEEE, 1998, pp. 6.

Argyros, et al., "Vision-Based Interpretation of Hand Gestures for Remote Control of a Computer Mouse", Springer-Verlag Berlin Heidelberg, vol. 3979, 2006, pp. 40-51.

"Foreign Office Action", Chinese Application No. 200880118654.7, (Aug. 31, 2012), 11 pages.

"Foreign Office Action", Japanese Application No. 2010-536041, (Sep. 19, 2012), 6 pages.

"Extended European Search Report", European Patent Application No. 08857292.0, (Nov. 30, 2012), 6 pages.

"Foreign Office Action", Chinese Application No. 200880118654.7, (Feb. 17, 2013), 9 pages.

"Foreign Office Action", Japanese Application No. 2010-536041, (Feb. 19, 2013), 4 Pages.

"Foreign Office Action", Chinese Application No. 200880118654.7, (Jul. 24, 2013), 9 Pages.

"Foreign Office Action", European Application No. 08857292.0, (Aug. 6, 2013), 5 Pages.

\* cited by examiner

MOTION-SENSING REMOTE CONTROL

BACKGROUND

Remote controls can be used to control many electronic devices, such as televisions, digital video recorders (DVRs), television set-top boxes, stereo systems, and other types of media devices. Users typically enjoy the convenience provided by advancements in technology, such as the remote controls that can be used to control the various devices. However, remote controls have become increasingly complex with the many buttons, selectable controls, and various configurations which make it difficult for some users to manipulate and/or learn how to use.

SUMMARY

This summary is provided to introduce simplified concepts of a motion-sensing remote control. The simplified concepts are further described below in the Detailed Description. This summary is not intended to identify essential features of the claimed subject matter, nor is it intended for use in determining the scope of the claimed subject matter.

In embodiment(s) of a motion-sensing remote control, a television remote control can include various sensors that sense a motion, or a combination of motions, of the device. The television remote control also includes an integrated circuit that receives a motion signal corresponding to the motion from the sensors and converts the motion signal into a remote control command. The television remote control can further include a light source that is activated by the integrated circuit to communicate the remote control command to a television client device to initiate a device action, such as a television control action, a program guide menu action, or a recorded media content action. The television remote control can also include remote control button(s) that are selectable to activate the various sensors.

In other embodiment(s) of a motion-sensing remote control, a television remote control can include various sensors that sense a motion, or a combination of motions of the device, and includes computer-executable instructions that execute on a processor to translate the motion into a television remote control command. The computer-executable instructions, such as a software or firmware application, can initiate communication of the remote control command to a television client device to initiate a device action, such as a television control action, a program guide menu action, or a recorded media content action. The television remote control can also include remote control button(s) that are selectable to activate the various sensors.

BRIEF DESCRIPTION OF THE DRAWINGS

Embodiments of a motion-sensing remote control are described with reference to the following drawings. The same numbers are used throughout the drawings to reference like features and components.

DETAILED DESCRIPTION

Embodiments of a motion-sensing remote control provide that a television remote control can be implemented with motion sensors that sense a motion, or a combination of motions, such that a user can motion with the device to initiate remote control functions. For example, a user can initiate volume control commands, channel change commands, DVR recorded media content commands, program guide navigation commands, and the like with various up, down, left, and/or right motions of the remote control device.

While features and concepts of the described systems and methods for a motion-sensing remote control can be implemented in any number of different environments, systems, and/or various configurations, embodiments of a motion-sensing remote control are described in the context of the following example systems and environments.

Figure 1:
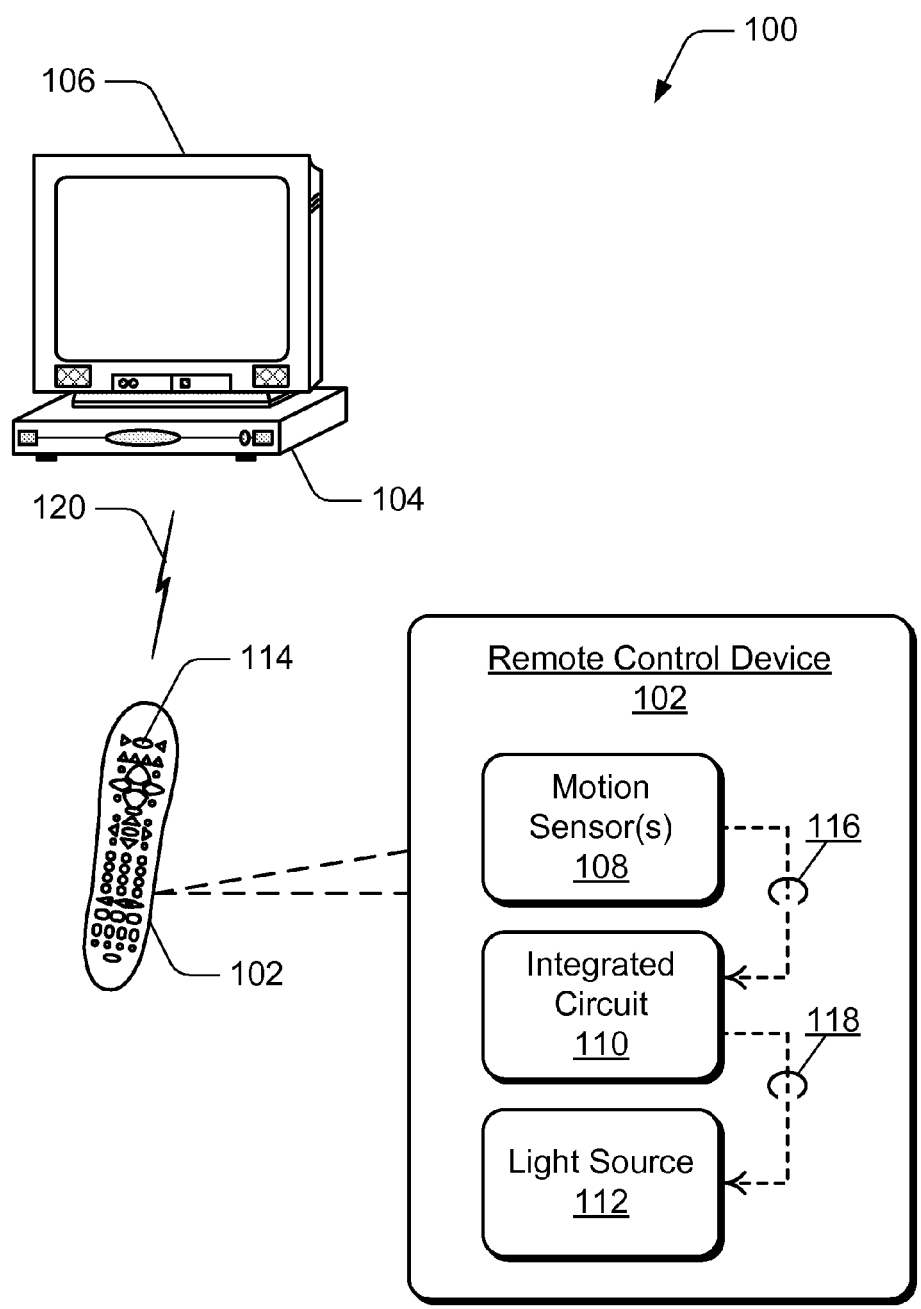
FIG. 1 illustrates an example system that includes a motion-sensing remote control in accordance with one or more embodiments.

FIG. 1 illustrates example embodiment(s) of a motion-sensing remote control in a system 100. In this example, system 100 includes a remote control device 102, a television client device 104, and a display device 106. Remote control device 102 (also referred to herein as a "remote control") is just one example of a motion-sensing remote control. The television client device 104 and display device 106 together are an example of a television client system that renders audio, video, and/or image data. The display device 106 can be implemented as any type of television, LCD, or similar display system to display television media content. The television client device 104 can be implemented as any one or combination of a television, a television set-top box, a digital video recorder (DVR) and playback system, an appliance device, a gaming console, and/or as any other type of media device.

In this example, remote control device 102 includes various motion sensor(s) 108, an integrated circuit 110, and a light source 112. A motion sensor 108 can be implemented to sense a motion, or a combination of motions, of the remote control device 102, such as when a user picks up the device and motions up, down, left, and/or to the right with the device. In various implementations, the remote control device 102 can be implemented with one motion sensor 108 or a combination of motion sensors which can be implemented as small or micro motion sensors, such as developed for micro electrical mechanical systems (MEMS). In an embodiment, the motion sensors 108 are implemented to sense any directional motion of the remote control device 102 when a user motions with the device. In other embodiments, the motion sensors 108 are initiated to sense directional motions of the remote control device 102 when a button 114, or multiple buttons on the device, are selected by a user.

When sensing a motion, or a combination of motions, remote control device 102 can be implemented to convert the motion(s) into a remote control command, and transmit the remote control command to the television client device 104 to initiate a device action. The integrated circuit 110 of the remote control device 102 can be implemented to receive a motion signal 116 from the motion sensors 108. For example, the motion sensors 108 can sense that remote control device 102 is moved in an upwards direction, and integrated circuit 110 can receive a motion signal 116 indicating an "up" motion of the remote control device. After receiving the motion signal 116 from the motion sensors 108, integrated circuit 110 can convert the motion signal into a remote control command 118.

In one example, the remote control device 102 can be used to control the television client device 104, and a motion "up" with the remote control can be implemented to indicate a "volume up" command. The integrated circuit 110 can convert the motion signal 116 indicating the motion "up" into the "volume up" remote control command 118. In some cases, the integrated circuit can convert a motion signal into a remote control command by translating the motion signal into a binary remote control command. In a similar example, a motion "right" with the remote control can be sensed by the motion sensors 108, and the integrated circuit 110 can convert the motion signal 116 into a "channel up" remote control command 118.

Light source 112 can be activated by integrated circuit 110 and can be initiated to communicate the remote control commands (e.g., remote control command 118) to television client device 104 as an infra-red signal 120. Light source 112 can be implemented as one or more light emitting diodes (LEDs) or any other suitable light source capable of transmitting an infra-red signal, or signals. Communication of a remote control command from the remote control device 102 can cause the television client device 104 to initiate a corresponding client device action, such as a television control action, a program guide menu action, or a recorded media content action.

Integrated circuit 110 can also receive signal(s) indicating that a remote control button 114 (or multiple buttons) on the remote control device 102 has been selected, such as by a user. Examples of remote control buttons can include an "on/off" button, a "device function" button, and a "client device selection" button. It should be appreciated that these are just some examples of the various remote control buttons contemplated. In an embodiment, integrated circuit 110 can be implemented to convert a motion signal that is received in combination with a signal indicating that a button has been selected into a remote control command.

The selection of a button 114, or multiple buttons on the remote control device 102, can be used in combination with the motion sensing capability of device 102 to initiate a client device action. In an embodiment, the remote control device 102 can include the remote control button 114 that is implemented to initiate the motion sensing capability of the device. For example, a user can pick-up the remote control device 102 and initiate remote control commands by depressing the various remote control buttons, or by depressing button 114 which activates the motion sensing capability of the remote so that the user can initiate the remote control commands by motion.

In an embodiment, the remote control button 114 (or any other designated button on the remote control device) is an "on/off" button which can be pressed once to turn "on" or "off" the motion sensing capabilities of the remote. In another embodiment, the remote control button 114 (or any other designated button on the remote control device) can be held in a depressed position to initiate the motion sensors of the device. Implementation of a button that can be depressed or selected by a user to initiate the motion sensing capabilities of remote control device 102 can guard against inadvertent motions being converted into remote control commands. It is to be appreciated that television remote control device 102 can include more than one button, and that various combinations of selecting button(s) and sensing motion(s) is contemplated.

In an embodiment, the integrated circuit 110 can be implemented to convert a motion signal 116 into a remote control command 118 if the device function button 114 is selected. If however the device function button 114 is not selected, the integrated circuit 110 can convert the motion signal 116 into a different remote control command. For example, if the remote control device 102 is being used to control the television client device 104, a motion "up" of the remote control device 102 can indicate a "volume up" command. However, if the remote control button 114 is selected, the same motion "up" can indicate a "channel up" command.

In an embodiment, remote control device 102 can be implemented to convert a combination of motions into a remote control command 118. For example, the remote control device 102 can be implemented to sense both a motion and an additional motion, and convert the two motions together into the remote control command 118. In one instance, the remote control device 102 may be used to control a DVR and a motion "right" can be sensed by the motion sensors 108 and converted into a "play" command by the integrated circuit 110 which causes the DVR to play recorded media content. However, the remote control device 102 can also be implemented to sense the same motion "right" as well as an additional motion "right" and convert the two motions into a different remote control command, such as a "fast forward" command. It is to be appreciated that any number of different motions and combinations of motions can be sensed by the motion sensors 108 and converted into a variety of different remote control commands by the integrated circuit 110.

Remote control device 102 may also initiate different remote control commands based on the type of device that it is being used to control. In an embodiment, the remote control button 114 (or any other designated button on the remote control device) is a "client device selection" button which can be selected so that a motion of the remote control device 102 corresponds to the type of device associated with the selected button. For example, if remote control device 102 is used to control a television, the remote control can be implemented to initiate a television control action, such as a volume change. If remote control device 102 is used to control a television set-top box, the remote control can be implemented to initiate a program guide menu action. If remote control device 102 is used to control a DVR or any other similar recorded media content device, the remote control can be implemented to initiate a recorded media content action, such as "play" or "fast-forward". If remote control device 102 is used to control a stereo device or any other media device, the remote control can be implemented to initiate a media device action.

Figure 2:
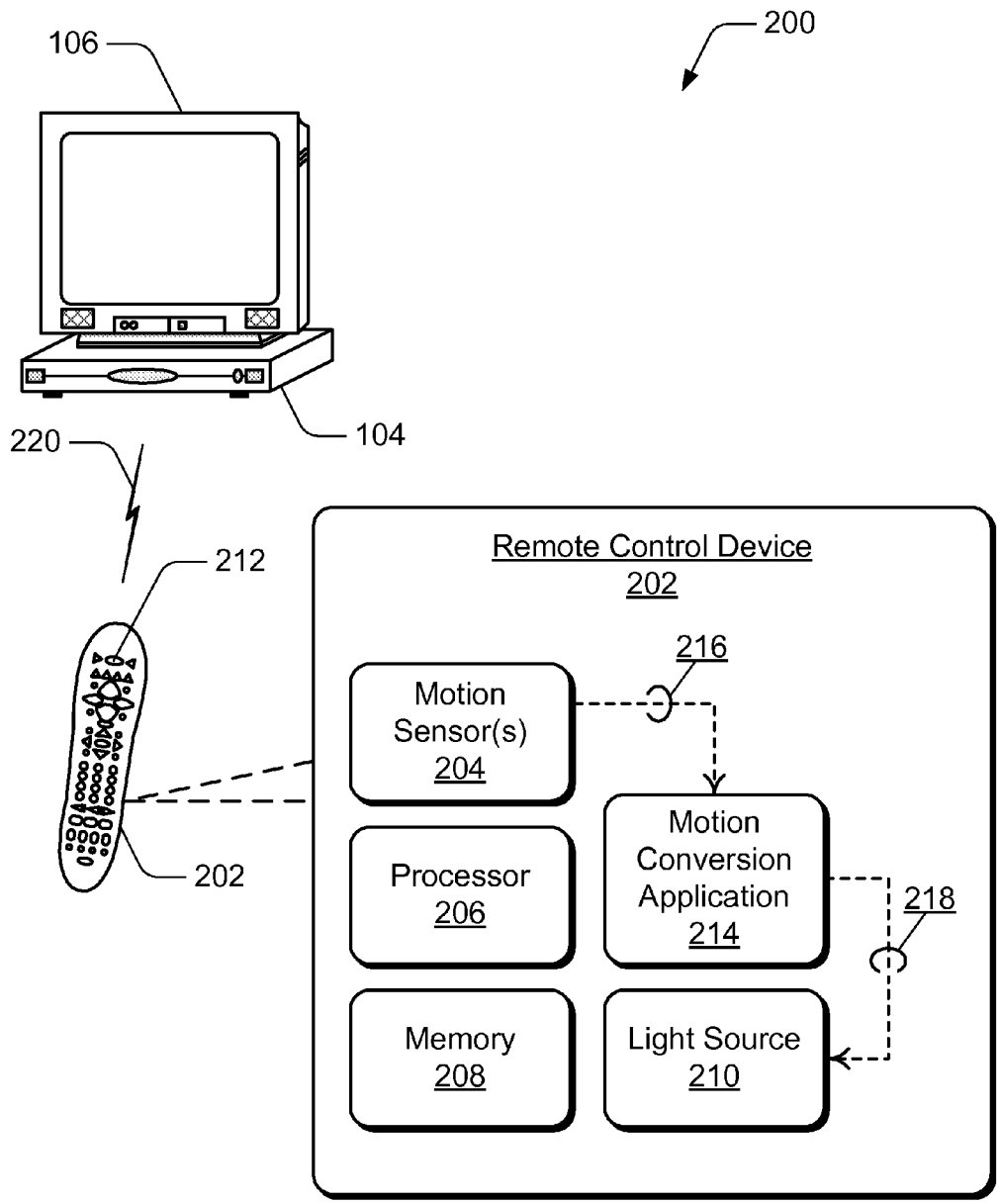
FIG. 2 illustrates an example system that includes a motion-sensing remote control in accordance with one or more embodiments.

FIG. 2 illustrates other embodiment(s) of a motion-sensing remote control in a system 200. In this example, system 200 includes a remote control device 202, as well as the television client device 104 and display device 106. Remote control device 202 is another example of a motion-sensing remote control. Similar to remote control device 102 described with reference to FIG. 1, remote control device 202 can be implemented to sense a motion, or a combination of motions, such as when a user picks up the device and motions up, down, left, and/or to the right with the device. Further, remote control device 202 can be implemented to convert a motion, or combination of motions, into a remote control command and communicate the remote control command to the television client device 104 to initiate a device action.

In this example, remote control device 202 includes various motion sensor(s) 204, a processor 206 (e.g., any of a microprocessor, controller, and the like), a memory 208, and a light source 210. In various implementations, the remote control device 202 can be implemented with one motion sensor 204 or a combination of motion sensors which can be implemented as small or micro motion sensors, such as developed for micro electrical mechanical systems (MEMS). In an embodiment, the motion sensors 204 are implemented to sense any directional motion of the remote control device 202 when a user motions with the device. In other embodiments, the motion sensors 204 are initiated to sense directional motions of the remote control device 202 when a button 212, or multiple buttons on the device, are selected by a user.

The memory 208 in remote control device 202 can be implemented as any type of computer-readable media, examples of which include random access memory (RAM) and non-volatile memory (e.g., any one or more of a read-only memory (ROM), flash memory, EPROM, etc.). The memory 208 provides a data storage mechanism to store an application and other types of information and/or data related to operational aspects of remote control device 202. In this example, remote control device 202 includes a motion conversion application 214 that can be maintained as a computer application with the memory 208 (e.g., computer-readable media) and executed on the processor 206 to implement embodiments of a motion-sensing remote control.

When sensing a motion, or a combination of motions, remote control device 202 can be implemented to convert the motion(s) into a remote control command, and transmit the remote control command to the television client device 104 to initiate a device action. The processor 206 and/or the motion conversion application 214 of the remote control device 202 can be implemented to receive a motion signal 216 from the motion sensors 204 that indicates a motion of the remote control device. After receiving the motion signal 216 from the motion sensors 204, the motion conversion application 214 can convert the motion signal 216 into a remote control command 218.

The light source 210 can be initiated by the processor 206 and/or the motion conversion application 214 to communicate the remote control commands (e.g., remote control command 218) to television client device 104 as an infra-red signal 220. Light source 210 can be implemented as one or more light emitting diodes (LEDs) or any other suitable light source capable of transmitting an infra-red signal, or signals. Communication of a remote control command from the remote control device 202 can cause the television client device 104 to initiate a corresponding client device action, such as a television control action, a program guide menu action, or a recorded media content action.

The motion conversion application 214 can also receive signal(s) indicating that a remote control button 212 (or multiple buttons) on the remote control device 202 has been selected, such as by a user. As described with reference to remote control device 102 shown in FIG. 1, examples of remote control buttons can include an "on/off" button, a "device function" button, and a "client device selection" button. It should be appreciated that the buttons discussed are just some examples of the various remote control buttons contemplated. The motion conversion application 214 can be implemented to convert a motion signal that is received in combination with a signal indicating that a button has been selected, into a remote control command. Further, the selection of a button 212, or multiple buttons on the remote control device 202, can be used in combination with the motion sensing capability of device 202 to initiate a client device action.

In an embodiment, the remote control device 202 can include the remote control button 212 that is implemented to initiate the motion sensing capability of the device. The remote control button 114 (or any other designated button on the remote control device) can be implemented as an "on/off" button which can be pressed once to turn "on" or "off" the motion sensing capabilities of the remote. In another embodiment, the remote control button 212 (or any other designated button on the remote control device) can be held in a depressed position to initiate the motion sensors of the device. It should be appreciated that television remote control device 202 can include more than one button, and that various combinations of selecting button(s) and sensing motion(s) is contemplated.

In an embodiment, the motion conversion application 214 can be implemented to convert a motion signal 216 into a remote control command 218 if the device function button 212 is selected. If however the device function button 212 is not selected, the motion conversion application 214 can convert the motion signal 116 into a different remote control command. In another embodiment, remote control device 202 can be implemented to convert a combination of motions into a remote control command 218. For example, the remote control device 202 can be implemented to sense both a motion and an additional motion, and convert the two motions together into the remote control command 218.

Remote control device 202 may also initiate different remote control commands based on the type of device that it is being used to control. In an embodiment, the remote control button 212 (or any other designated button on the remote control device) can be a "client device selection" button which can be selected so that a motion of the remote control device 202 corresponds to the type of device associated with the selected button.

Generally, any of the functions, methods, procedures, modules, and components described herein can be implemented using hardware, software, firmware (e.g., fixed logic circuitry), manual processing, or any combination thereof. A software implementation of a function, method, procedure, module, or component represents program code that performs specified tasks when executed on a computing-based processor. Example method 300 described with reference to FIG. 3 may be described in the general context of computer-executable instructions. Generally, computer-executable instructions can include applications, routines, programs, objects, components, data structures, procedures, modules, functions, and the like that perform particular functions or implement abstract data types.

The method(s) may also be practiced in a distributed computing environment where functions are performed by remote processing devices that are linked through a communications network. In a distributed computing environment, computer-executable instructions may be located in both local and remote computer storage media, including memory storage devices. Further, the features described herein are platform-independent such that the techniques may be implemented on a variety of computing platforms having a variety of processors.

Figure 3:
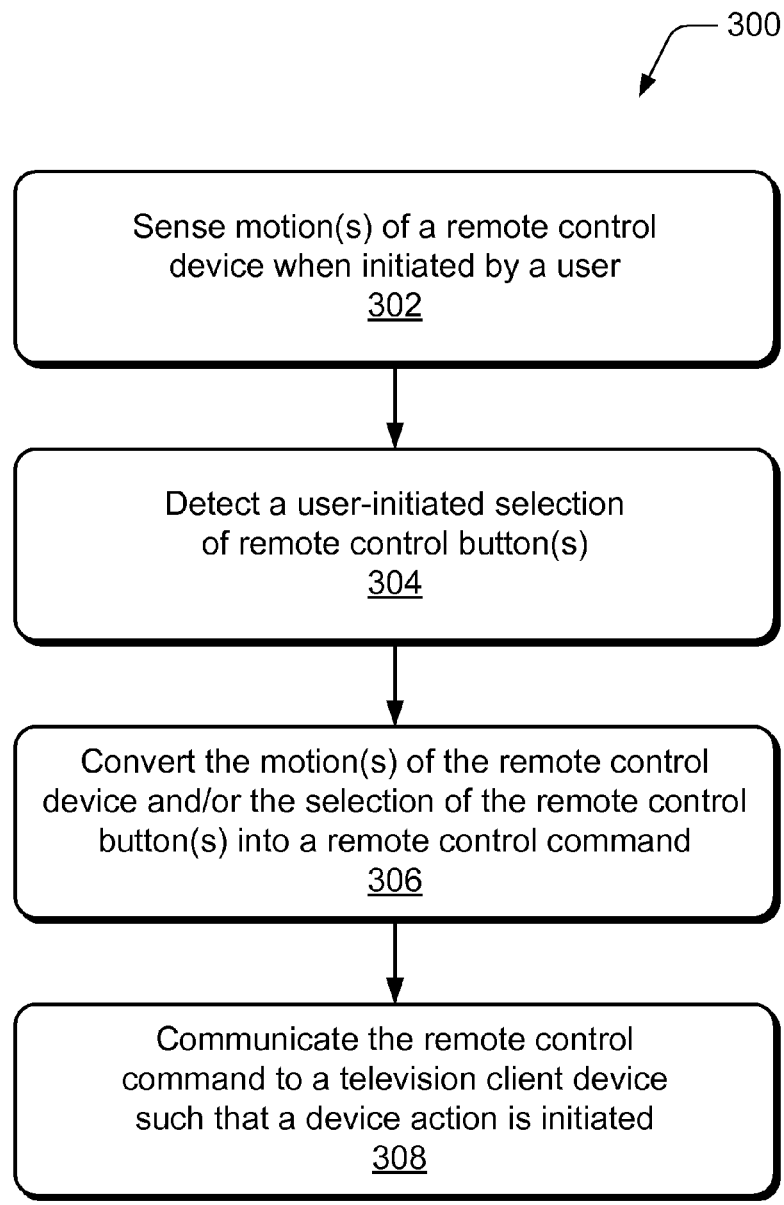
FIG. 3 illustrates example method(s) for a motion-sensing remote control in accordance with one or more embodiments.

FIG. 3 illustrates example method(s) 300 of a motion sensing remote control. The order in which the method is described is not intended to be construed as a limitation, and any number of the described method blocks can be combined in any order to implement the method, or an alternate method.

At block 302, motion(s) of a remote control device are sensed when initiated by a user. For example, the motion sensors 108 of remote control device 102 (FIG. 1) sense motions, or a combination of motions, of the device when initiated by a user, such as when a user picks up the device and motions up, down, left and/or to the right with the device. Similarly, the motion sensors 204 of remote control device 202 (FIG. 2) sense motions, or a combination of motions, of the device when initiated by a user.

At block 304, the user-initiated selection of remote control button(s) is detected. For example, remote control device 102 includes a device function button 114 that, in various embodiments, can be selected by a user in combination with the motion sensing capability of device 102 to initiate a client device action. For example, a user can depress button 114 which activates the motion sensors 108 of the remote control so that the user can initiate remote control commands by motion. The integrated circuit 110 at remote control device 102 detects signal(s) indicating that the remote control button 114 (or multiple buttons) has been selected.

Similarly, remote control device 202 includes a device function button 212 that, in various embodiments, can be selected by a user in combination with the motion sensing capability of device 202 to initiate a client device action. For example, a user can depress button 212 which activates the motion sensors 204 of the remote control so that the user can initiate remote control commands by motion. The processor and/or motion conversion application 214 at remote control device 202 detects signal(s) indicating that the remote control button 212 (or multiple buttons) has been selected.

At block 306, the motions(s) of the remote control device and/or the selection of the remote control button(s) are converted into a remote control command. For example, the integrated circuit 110 at remote control device 102 receives the sensed motion(s) of the device (from block 302) and/or receives the detected signal(s) of remote control button selections (from bock 304). The integrated circuit 110 then converts the sensed motions(s) and/or the detected button signal(s) into a remote control command 118. Similarly, the processor 206 and/or the motion conversion application 214 at remote control device 202 receives the sensed motion(s) of the device and/or receives the detected signal(s) of remote control button selections. The motion conversion application 214 then converts or otherwise translates the sensed motions(s) and/or the detected button signal(s) into a remote control command 218.

At block 308, the remote control command is communicated to a television client device such that a device action is initiated. For example, the integrated circuit 110 at remote control device 102 initiates activation of light source 112 to communicate remote control commands 118 to television client device 104 as an infra-red signal 120. Similarly, the processor 206 and/or the motion conversion application 214 at remote control device 202 initiates activation of light source 210 to communicate remote control commands 218 to television client device 104 as an infra-red signal 220. Communication of a remote control command activates the television client device 104 to initiate a corresponding client device action, such as a television control action, a program guide menu action, or a recorded media content action.

Although embodiments of a motion-sensing remote control have been described in language specific to features and/or methods, it is to be understood that the subject of the appended claims is not necessarily limited to the specific features or methods described. Rather, the specific features and methods are disclosed as example implementations of a motion-sensing remote control.

The invention claimed is:

1. A method, comprising:
  detecting a depressed position of a first remote control button to initiate one or more motion sensors of a television remote control device;
  sensing, by the one or more motion sensors, one or more motions of the television remote control device when initiated by a user, the sensing based on the first remote control button remaining in the depressed position;
  detecting a user-initiated selection of a second remote control button while sensing the one or more motions of the television remote control device;
  converting the one or more motions in combination with the selected second remote control button into a remote control command for a television client device, wherein different motions have different directional aspects and correspond to different remote control commands for the television client device that are stored on the remote control device configured to cause different device actions to be performed by the television client device; and
  communicating the remote control command to the television client device to initiate one of the different device actions.

2. A method as recited in claim 1, wherein the remote control command is converted into an infra-red signal from the one or more motions and communicated to the television client device as the infra-red signal.

3. A method as recited in claim 1, wherein converting the one or more motions includes translating the one or more motions into electronic signals and converting the electronic signals into infra-red signals that are communicated to the television client device as the remote control command.

4. A method as recited in claim 1, wherein the remote control command is communicated to the television client device to initiate a television control action.

5. A method as recited in claim 1, wherein the remote control command is communicated to the television client device to initiate a program guide menu action.

6. A method as recited in claim 1, wherein the remote control command is communicated to the television client device to initiate a recorded media content action.

7. A method as recited in claim 1, wherein the one or more motions in combination with a different selected remote control button causes a different remote control command.

8. A television remote control device, comprising:
  one or more sensors configured to sense a motion of the television remote control device;
  an integrated circuit configured to receive a motion signal corresponding to the motion from the one or more sensors, the integrated circuit further configured to convert the motion signal into a remote control command, wherein different motion signals composed of one or more combinations of directional motion correspond to different remote control commands, the different remote control commands stored on the television remote control device corresponding to different device actions performable by a television client device;
  a first remote control button that, when in a depressed position, turns on the one or more sensors to sense the motion of the television remote control device;
  a second remote control button configured for user selection that initiates the integrated circuit to convert the motion signal into a different remote control command for the television client device when the motion signal is received, the different remote control command based in part on the first remote control button remaining in the depressed position; and
  a light source activated by the integrated circuit and configured to communicate the remote control command to the television client device as an infra-red signal to initiate a device action.

9. A television remote control device as recited in claim 8, further comprising:
  an additional remote control button configured for user selection that initiates the integrated circuit to convert the motion signal into the remote control command for the television client device when the motion signal is received.

10. The television remote control device as recited in claim 8, wherein the remote control command is generated as a television control action.

11. The television remote control device as recited in claim 8, wherein the remote control command is generated as a recorded media content action.

12. The television remote control device as recited in claim 8, wherein the one or more sensors are further configured to sense an additional motion of the television remote control device, and wherein the integrated circuit is further configured to:
  receive an additional motion signal corresponding to the additional motion from the one or more sensors; and
  convert the motion signal and the additional motion signal together into another different remote control command.

13. The television remote control device as recited in claim 8, wherein the integrated circuit is further configured to translate the motion signal into a binary remote control command that is converted into the infra-red signal which is communicated to the television client device.

14. The television remote control device as recited in claim 8, wherein the remote control command is generated as a program guide menu action.

15. A television remote control device, comprising:
  one or more sensors configured to sense a directional motion of the television remote control device;
  computer-executable instructions configured to execute on a processor to translate the directional motion into a remote control command, wherein different directional motions correspond to different remote control commands configured to cause different device actions to be performed by a device, the different directional motions correlate to different actions to be performed by the device based, at least in part, on a type of the device, the computer-executable instructions further configured to initiate communication of the remote control command to a television client device to initiate a device action;
  a first remote control button that, when selected, initiates the one or more sensors to sense the motion of the television remote control device;
  a second remote control button configured for user selection that initiates the computer-executable instructions to translate the directional motion into a different remote control command based in part on the first remote control button remaining in the depressed position.

16. The television remote control device as recited in claim 15, further comprising:
  an additional remote control button configured for user selection that initiates the computer-executable instructions to translate the directional motion into the remote control command.

17. The television remote control device as recited in claim 15, wherein the remote control command is generated as a television control action.

18. The television remote control device as recited in claim 15, wherein the remote control command is generated as a recorded media content action.

19. The television remote control device as recited in claim 15, wherein the one or more sensors are further configured to sense an additional motion of the television remote control device, and wherein the computer-executable instructions are further configured to:
  receive an additional motion from the one or more sensors; and
  convert the directional motion and the additional motion together into another different remote control command.

20. The television remote control device as recited in claim 15, wherein the remote control command is generated as a program guide menu action.

* * * * *